July 10, 1962 W. H. GLASS ETAL 3,043,496
MEANS AND METHOD OF INHIBITING THE RISE OF
THE TEMPERATURE OF COMPRESSOR CYLINDER
INCIDENTAL TO OPERATION WHILE UNLOADED
Filed Nov. 12, 1958 2 Sheets-Sheet 1

INVENTORS
William H. Glass
Milton L. Hancock
BY
Adelbert A. Steinmiller
Attorney July 10, 1962 W. H. GLASS ETAL 3,043,496
MEANS AND METHOD OF INHIBITING THE RISE OF
THE TEMPERATURE OF COMPRESSOR CYLINDER
INCIDENTAL TO OPERATION WHILE UNLOADED
Filed Nov. 12, 1958 2 Sheets-Sheet 2
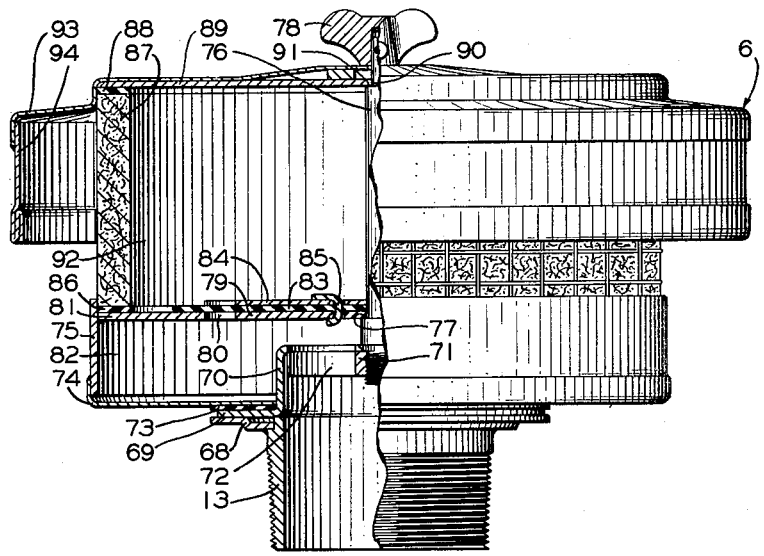
FIG. 2
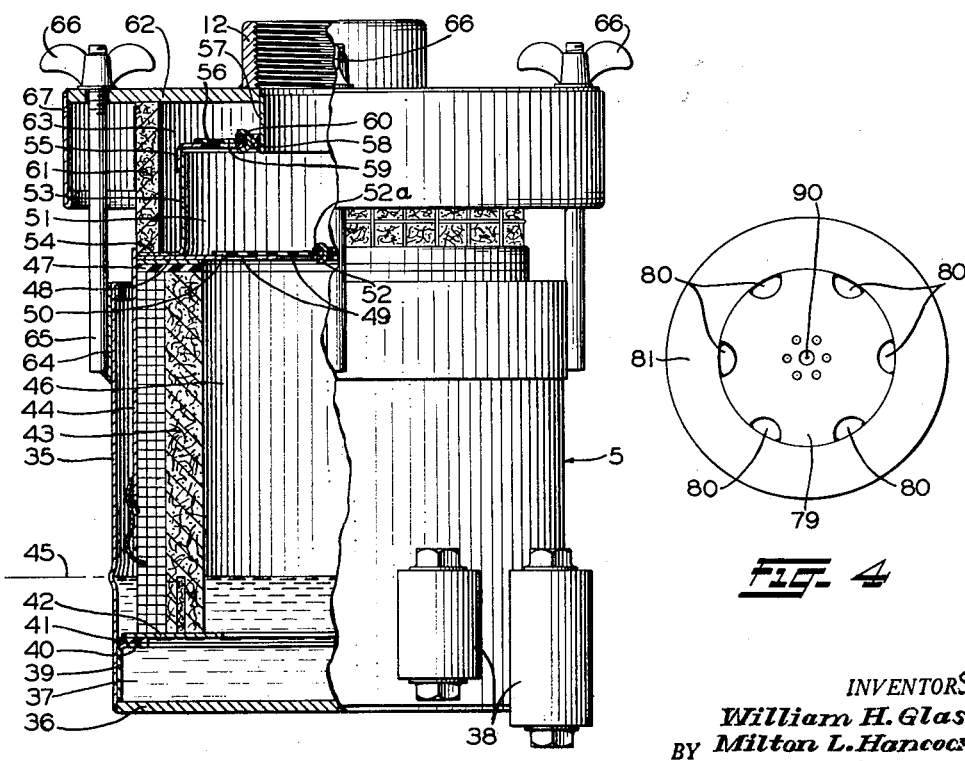
FIG. 3
FIG. 4
INVENTORS
William H. Glass
BY Milton L. Hancock
Attorney United States Patent Office 3,043,496
Patented July 10, 1962

3,043,496
MEANS AND METHOD OF INHIBITING THE RISE OF THE TEMPERATURE OF COMPRESSOR CYLINDER INCIDENTAL TO OPERATION WHILE UNLOADED
William H. Glass, Pittsburgh, and Milton L. Hancock, McKeesport, Pa., assignors to Westinghouse Air Brake Company, Wilmerding, Pa., a corporation of Pennsylvania
Filed Nov. 12, 1958, Ser. No. 773,206
2 Claims. (Cl. 230—30)

This invention relates to means and method for inhibiting the rise of the operating temperature of a compressor cylinder while the compressor is operating unloaded.

In certain types of conventional air compressors means is provided for holding the inlet valve open to effect unloading of the compressor. Therefore, the compressor piston, upon its suction or downward stroke within its cylinder, draws air from the atmosphere through an inlet filter or strainer and into the compressing chamber, and, upon its compression or upward stroke, forces this air from the cylinder past the open valve and through the filter or strainer back to atmosphere. The filter of strainer is, in some instances, located some distance from the cylinder to insure intake of cool atmospheric air and is connected to the inlet valve chamber by a relatively long section of pipe. With the filter or strainer thus remotely located from the compressor, some of the air drawn into and forced out of the compressing chamber while the compressor is operating unloaded never leaves the intake pipe. Consequently, due to friction of the air within the pipe, this "churning" or oscillatory movement of the same air back and forth within the pipe, inlet valve chamber and compressing chamber, increases the temperature of the air which in turn increases the temperature of the pipe and the walls of the inlet valve chamber and compressing chamber. This in turn causes an increase in the temperature of the air delivered by the compressor during operation under load conditions and external cooling apparatus for the delivered air is thus customarily employed.

In order to avoid heating of the pipe, inlet filter, and compressor in the manner described above and thus to obviate the necessity for external cooling apparatus for air delivered by the compressor, the present invention functions during the time a compressor of the type mentioned is operating unloaded, to provide a continuous supply of fresh, cool, atmospheric air into the compressing chamber upon each downward or suction stroke of the piston, by causing the exhaustion of air thus drawn into the compression chamber directly back to the atmosphere upon each upward stroke.

According to the invention, there is provided for use with an air compressor having an inlet filter or strainer located remote from the compressor inlet valve chamber and connected thereto by a pipe, a pressure relief valve device, such as a check valve, opening in the direction of the atmosphere and connected, as by a pipe T, closely adjacent to the inlet valve chamber of the compressor in the air intake pipe of the compressor. During operation of the compressor while unloaded, the air forced back into the intake pipe is promptly discharged to atmosphere via the check valve, whereupon a fresh and cool supply of atmospheric air is drawn back into the inlet valve chamber and the low pressure chamber of the compressor on the subsequent intake stroke of the compressor piston. Oscillatory movement of air in the intake pipe is thus avoided and the rise of the operating temperature of the compressor cyinder thus inhibited.

In the accompanying drawings:

FIG. 2 is an elevational view, partly in section and on an enlarged scale, showing structural details of the pressure relief device shown in FIG. 1.

FIG. 3 is an elevational view, partly in section and on an enlarged scale, showing structural details of the air inlet filter shown in FIG. 1.

FIG. 4 is a plan view, on an enlarged scale, showing details of a valve seat in the pressure relief device of FIG. 2.

Description

Figure 1:
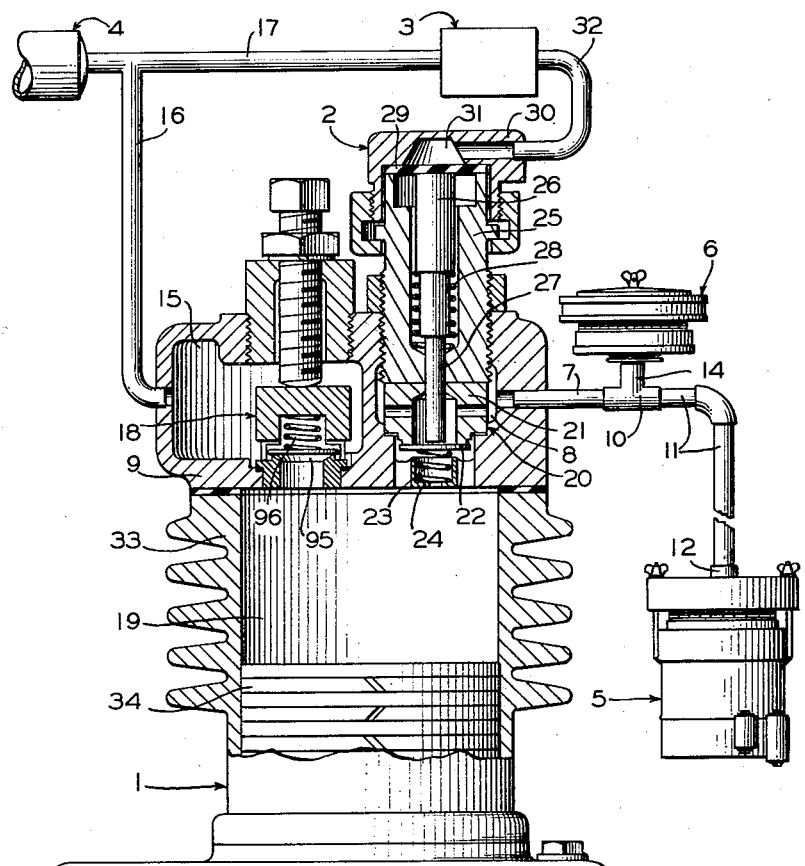
FIG. 1 is a diagrammatic view, partly in section, of an air compressor cylinder, which may be the low pressure stage of a multiple stage compressor, showing the novel arrangement of a pressure relief device located closely adjacent the inlet chamber, as by a T-connection in the intake pipe at the end of which is a remotely located air inlet filter.

Referring to FIG. 1 of the drawings, there is shown an installation comprising an air compressor 1 driven by any suitable means (not shown), a compressor unloading device 2 associated with the inlet valve of the compressor, a governor 3 which may be of any suitable type, a storage reservoir 4, an air inlet filter 5 and a pressure relief device 6.

A short pipe or nipple 7 extending from an inlet valve chamber 8 formed in a removable cylinder head 9 secured to the cylinder of the compressor 1 by any suitable means (not shown) is connected to one end of a pipe T 10. A pipe 11 constituting a first branch of the pipe 7 extends from the other end of the pipe T 10 and is connected to a threaded boss 12 (FIG. 3) forming an air outlet connection for the air inlet filter 5. The pressure relief device 6 is a provided with a threaded boss 13 (FIG. 2), which threaded boss is screw-threaded into a side outlet 14 of the pipe T 10. The pressure relief device 6, therefore, constitutes a second branch of the pipe 7.

The cylinder head 9 has formed therein an exhaust or discharge chamber 15 which is constantly connected to the reservoir 4 by way of a pipe 16 having a branch 17 connected to the governor 3. The discharge chamber 15 has mounted therein a discharge valve assembly 18 which may be of any well-known construction, and operates to permit fluid to flow from a compression chamber 19 in the cylinder of the compressor 1 to the exhaust chamber 15 and thence to the reservoir 4, and to prevent backflow of fluid from the reservoir 4 and the discharge chamber 15 to the compression chamber 19.

The inlet valve chamber 8 has mounted therein an inlet valve assembly 20. As shown in FIG. 1, the inlet valve assembly 20 comprises a seat member 21 having an annular seat rib formed thereon on which an inlet valve in the form of a disc valve 22 is adapted to seat. The valve 22 is yieldingly pressed into seated relation on the seat member 21 by a coil spring 23 which is interposed between the valve 22 and a spring cage 24 secured as by a press fit in a bore in the cylinder head 9.

The inlet valve assembly 20 has associated therewith the unloading device 2. The unloading device 2 comprises a tubular body 25 which is secured in the cylinder head 9, as by a screw connection, and serves to maintain the seat member 21 in position in the inlet chamber 8. The body 25 has a bore therein in which is mounted a plunger 26 having a stem 27 the end of which is adapted to contact the valve 22. A coil spring 28 is mounted in the bore in the body 25 in surrounding relation to the stem 27 and is interposed between a shoulder on plunger 26 and the base of the bore in the body 25 so as to yieldingly urge the plunger 26 upward, thus causing the end of the stem 27 to be out of contact with the valve 22 and thereby permitting the spring 23 to yieldingly bias the valve 22 into seated contact with the seat member 21.

The upper end of the plunger 26 contacts one side of a flexible diaphragm 29 which is clamped between body 25 and a cap member 30. The diaphragm 29 cooperates with the cover 30 to form a chamber 31 which is connected by way of a pipe 32 with the governor 3.

The compression chamber 19 in the compressor 1 comprises a bore formed in a cylinder body 33. Mounted in the bore in the cylinder body 33 is a piston 34 which is reciprocated within the bore by means of a crankshaft that is mounted in well-known manner in a crankcase chamber, the housing of which is shown.

The air inlet filter 5 may be of any suitable type, and comprises, for example, an outer cylindrical shell 35 closed at its lower end by an annular plate 36 welded thereto to form an oil chamber 37 which may be filled with a suitable type of oil through a pair of oil fill and drain devices 38. Disposed within and coaxial with the outer shell 35 and resting on the plate 36 is a ring 39 having an inturned annular flange 40. A second ring 41 constructed of suitable resilient material, such as rubber, rests upon the annular flange 40, the inner diameter of ring 41 being substantially the same as the inner diameter of the annular flange. A flat perforated ring 42 of rigid material, such as sheet steel, rests upon the upper face of the ring 41. The inner diameter of the ring 42 is substantially smaller than the inner diameter of the ring 41. The ring 42 serves to support an annular filter element 43 of any suitable type, such as an oil bath type filter, which may be of any suitable construction. The filter element 43 is tightly encased by a cylindrical shell 44 and is disposed in concentric spaced relation within cylindrical shell 35. The lower end of the filter element 43 extends below the lower end of the shell 44 and the upper end of the shell extends above the upper end of the filter element.

The chamber 37 is filled with oil to the level indicated by the broken line identified by the numeral 45. Therefore, as can be clearly seen from FIG. 3, the lower end of the filter element 43 is submerged in the oil bath but not the lower end of the shell 44. This arrangement of the oil chamber 37, filter element 43 and shell 44 provides a path for the flow of air from the atmosphere downward through an annular chamber formed between the cylindrical shells 35 and 44, and through the filter element 43 between the lower end of the shell 44 and the top of the oil in chamber 37 to a chamber 46 within the filter element and above the oil chamber.

Since the lower end of the filter element 43 is immersed in the oil in the chamber 37, the oil will rise by capillary action into the filter element and coat the surface of the parts thereof, which, for example, may be several layers of fine mesh screen wire, with a thin film of oil. This film of oil is effective to remove the dirt and other foreign matter in the atmospheric air as it passes through the filter element 43 to the chamber 46.

A ring 47, of suitable resilient material such as rubber, having inner and outer diameters substantially the same as the filter element 43, rests upon the top of the filter element and snugly within the shell 44. Resting against the top surface of the ring 47 is a flat annular valve seat element 48 having a plurality of relatively large diameter perforations 49 circularly arranged therein. On the upper side of the annular valve seat element 48 is a flat annular valve element 50 of suitable resilient and flexible material such as rubber. The outer diameter of the valve element 50 is such as to fall outside the perforations 49 in the valve seat element 48 and thereby prevent backflow of air from a chamber 51 above seat element 48 to the chamber 46 when flat against the seat member, while raising up due to air pressure in chamber 46 to allow flow to chamber 51. The valve element 50 is secured adjacent its inner diameter to the valve seat element 48 by several wire clamps 52. Each clamp 52 may comprise a short piece of stiff wire which passes through the valve element 50 and a small hole drilled in the valve seat element 48 and has its opposite ends bent into contact with a plate 52a, resting against the upper side of the valve element 50, and valve seat element 48 respectively.

The chamber 51 at the upper side of valve seat element 48 is formed within an annular sheet-metal sleeve 53, the lower end of which has an out-turned flange 54 substantially the same in diameter as valve seat element 48. The flange 54 fits snugly within the cylindrical shell 44 and rests upon the upper peripheral edge of the valve seat element 48. A second flat annular valve seat element 55 is suitably secured to the opposite or upper end of the sleeve 53 and has a plurality of perforations 56 of relatively large diameter therein. A sleeve 57 is fitted in a central bore 58 in the valve seat element 55 and the lower end of this hollow sleeve 57 is welded to the valve seat element 55.

Disposed on the upper side of the valve seat element 55 is a flat annular valve element 59 of resilient flexible material, similar to that of which the valve element 50 is made. The inner edge of the valve element 59 is secured to the valve seat element 55 by several wire clamps 60 in the same manner as the valve element 50 is secured to the valve seat element 48.

A second annular filter element 61 of suitable construction is disposed in concentric spaced relation surrounding the annular sleeve 53 with the lower end thereof in contact with the upper side of out-turned flange 54 and snugly fitted within the upper end of the cylindrical shell 44. Resting against the upper end of the filter element 61 is a flat annular cover plate 62 having a central bore for receiving the upper end of the sleeve 57 which is welded thereto. The plate 62, sleeve 57, valve element 59, valve seat element 55, annular sleeve 53, and annular filter element 61 cooperate to form a chamber 63 which is open to atmosphere through the filter element 61. Fluid under pressure may flow into chamber 63 from the chamber 51 upon the seating of valve element 50 on valve seat element 48 and the unseating of valve element 59 from the valve seat element 55 in response to the pressure in chamber 51 exceeding the pressure in the chambers 46 and 63.

A circular sleeve 64 is disposed about the upper end of the outer cylindrical sleeve 35 and welded thereto. A plurality of rods 65 equally spaced about the outer periphery of the sleeve 64 are welded thereto preferably by the same weld that secures the sleeve 64 to the shell 35. The upper ends of the rods 65 are threaded and extend through a plurality of correspondingly spaced holes provided in the annular plate 62 adjacent its outer periphery. A plurality of wing nuts 66 screwed on the end of each rod 65 serve to press the annular plate 62 against the upper end of the filter element 61 to maintain the parts of the air inlet filter 5 within the outer cylindrical shell 35 against sidewise movement from their assembled position as a result of the vibration which the filter 5 may encounter when used with an air compressor mounted on a railway locomotive.

The hereinbefore-mentioned threaded boss 12 is disposed on the upper side of the annular plate 62 and welded thereto in a position coaxial with the sleeve 57 to permit the air inlet filter 5 to be secured to the lower end of the pipe 11 (FIG. 1).

A circular sleeve 67 secured at one end as by welding to the periphery of the annular plate 62, extends downwardly to deflect in a downward direction any air that may flow from the chamber 51 to the chamber 63 past the annular valve element 59 and thence through the filter element 61 to atmosphere.

The relief valve 6 comprises an annular plate 68 having a central hole into which one end of the hereinbefore-mentioned threaded boss 13 fits and is secured as by a weld. The outer portion of the annular plate 68 is offset to provide a flat circular shelf against the top side of which rests an annular out-turned flange 69 formed on the lower end of a sleeve member 70. Supported coaxially within the sleeve 70 adjacent its upper end as by a three-pronged spider 72 (only one prong of which is shown) welded to the wall of sleeve 70 is an internally threaded boss 71.

An annular gasket 73 having a central opening, the diameter of which is substantially the same as the outside diameter of the sleeve member 70, is disposed between the upper face of the annular flange 69 and a shallow annular cup-shaped member 74. Disposed within the cup-shaped member 74 is a sleeve 75 which fits snugly within the cup-shaped member 74 and is welded thereto.

Screwed into the threaded boss 71 is a threaded rod 76 having a shoulder 77 intermediate its ends and a wing nut 78 secured, as by a pin, to the opposite end. Resting against the shoulder 77 on the rod 76 is a flat annular valve seat element 79 having a plurality of semi-circular recesses 80 cut in spaced relation about its periphery. The valve seat element 79 is disposed within a circular opening of substantially the same diameter formed in an annular plate 81. The valve seat element 79 and the annular plate 81 have the same thickness and are secured together by a plurality of welds, there being a weld located between each two adjacent recesses 80. The outside diameter of the annular plate 81 is substantially the same as the inside diameter of the sleeve 75 to permit the plate to cooperate with the sleeves 70 and 75 and the cup-shaped member 74 to form a chamber 82 which is open through the spider 72 to the interior of the hollow sleeve member 70 and the boss 13.

Disposed on the upper side of the valve seat element 79 is a flat annular valve element 83 of resilient flexible material. The diameter of the valve element 83 is somewhat greater than the diameter of the annular valve seat element 79 to insure that the openings formed by the recesses 80 are completely closed in the normal position of the valve element.

Resting against the upper side of the valve element 83 is a flat annular plate 84 having the same diameter as the valve seat element 79. The plate 84 is provided with the same number of semi-circular recesses spaced about its periphery as the valve seat element 79 and is identical thereto. The plate 84, valve element 83 and valve seat element 79 are secured together by several clamps 85 which may comprise a short piece of stiff wire which passes through small aligned holes in each of the three parts and has its opposite ends bent into contact with the plate 84 and valve seat element 79 respectively.

The construction of the valve seat element 79, valve element 83 and plate 84, as described above, permits the outer peripheral portion of the resilient valve element 83 that normally overlies the semi-circular recesses 80 to be deflected upward, by fluid pressure in the chamber 82 to allow the fluid to pass through the recesses 80 in the valve seat element 79.

Disposed around the outer upper peripheral edge of the plate 81 is a flat annular rubber ring 86. Resting against the upper side of the ring 86 is the lower end of an annular filter element 87 of any suitable construction arranged in coaxial relation to the rod 76. The purpose of the filter element 87 is to remove dust, dirt and other foreign matter in the atmospheric air that would be drawn into the compression chamber 19 of the compressor 1 through this filter element on the suction stroke of the piston 34 should the resilient annular valve element 83 become ruptured or deteriorated so that it could not prevent flow to the chamber 82 through the recesses 80 in the valve seat element 79.

Resting against the upper end of the filter element 87 is a flat annular rubber ring 88 which may be a duplicate of and interchangeable with the ring 86. These rings 86 and 88 seal the ends of the filter element 87 to prevent fluid by-passing the filter element.

A cover 89 fits on the top of the filter element 87 and has a central aperture 90 through which the rod 76 is passed prior to securing the wing nut 78 to the rod and the rod is provided with a second shoulder 91 against which the cover rests. Therefore, when the lower end of rod 76 is screwed into the boss 71 subsequent to assembling the cover 89 and the wing nut 78 to the rod, the cover will be effective to compress the resilient rings 86 and 88 and seal a chamber 92 formed within the filter element 87 against the flow of air thereto and therefrom except through filter element 87 itself.

The outer periphery of the cover 90 is provided with a downwardly turned flange 93 to which is secured, as by welding, a sleeve 94 which serves to deflect in a downward direction the air that is forced from the chamber 82 to the chamber 92 and thence through the filter element 87 upon the compression stroke of the piston 34 of the compressor 1.

*Operation*

With the various parts of the fluid compressing apparatus in the position in which they are shown in the drawing and with no fluid under pressure in the apparatus, the inlet valve 22 will be seated on seat member 21 by the spring 23 and a discharge valve 95 in the valve assembly 18 will be seated by a spring 96. Upon starting the compressor 1, the piston 34 will be reciprocated within the compression chamber 19. As the piston 34 is moved downward from its uppermost or top dead center position to the position in which it is shown in FIG. 1 of the drawing, atmospheric air is drawn into the compression chamber 19 through the annular chamber formed between the cylindrical shells 35 and 44 of the inlet filter 5, that portion of the filter element 43 below the shell 44 and above the oil level 45, the chamber 46, the perforations 49 in the valve seat element 48, past the valve element 50, and through the chamber 51, hollow sleeve 57, boss 12, pipe 11, pipe T 10, nipple 7, inlet chamber 8 and past the inlet valve 22 which is unseated in response to the vacuum created in the chamber 19 by the downward movement of the piston.

When the piston 34 reaches its lowermost or bottom dead center position, the compression chamber 19 will be filled with air at atmospheric pressure. Therefore, when the piston 34 begins its upward or compression stroke, this air will be compressed to a pressure greater than atmospheric pressure, the pressure increasing as the piston continues its upward stroke. The fluid thus compressed in the compression chamber 19 is effective to seat the inlet valve 22 on its seat member 21 and unseat the discharge valve 95 when the pressure in the compression chamber 19 is increased sufficiently to overcome the opposing force of the spring 96.

When the discharge valve 95 is thus unseated, fluid under pressure will flow from the compression chamber 19 to the discharge chamber 15 and thence through the pipe 16 to the storage reservoir 4.

Operation of the compressor 1 will effect the supply of fluid under pressure to the reservoir 4 until the pressure therein reaches a chosen pressure corresponding to the cut-out pressure of the governor 3. Upon the pressure in the reservoir 4 reaching the chosen cut-out pressure, the governor 3 will operate to establish a communication between the branch pipe 17 and the pipe 32 whereupon fluid under pressure will flow from the reservoir 4 to the chamber 31 in the unloading device 2.

In response to an increase in the pressure of fluid in the chamber 31 of the unloading device 2, the diaphragm 29 and plunger 26 are moved downward against the opposing force of the spring 28 to move the lower end of stem 27 into contact with the inlet valve 22. As the pressure continues to increase in the chamber 31, the stem 27 will effect unseating of the inlet valve 22 from seat member 21 to unload the compressor.

As the compressor continues to operate unloaded, each downward or suction stroke of the piston 34 will draw air at atmospheric pressure through the intake filter device 5 via the hereinbefore-mentioned path into the compression chamber 19. However, upon each upward stroke of the piston 34, the air present in the chamber 19 will be forced therefrom past the now open inlet valve 22 to the inlet valve chamber 8 which is connected to one side of the pipe T 10 by the short pipe or nipple 7. The air supplied to the inlet valve chamber 8 will be at a pressure slightly above atmospheric pressure. Consequently, the air supplied to the chamber 8 will flow therefrom to one end of the pipe T 10. Since the opposite end of the pipe T 10 is connected by a comparatively long pipe 11 to the air inlet filter 5 and the chamber 51 therein, and the boss 13 of the pressure relief device 6 is screw-threaded into the side outlet of the pipe T 10, the path that air under pressure must travel to reach the chamber 51 is much longer than the path that air under pressure must travel to reach the chamber 82 in the pressure relief device 6. Consequently, the air pressure in the chamber 82 in the pressure relief device 6 will increase more rapidly than the pressure in the chamber 51 in the air inlet filter 5 since both chambers receive fluid under pressure through the same supply conduit, namely the short pipe or nipple 7, and thence through the respective branch thereof, it being noted that the volume of the second branch which connects the pipe T 10 and chamber 82 is considerably less than the volume of the first branch which connects the pipe T and the chamber 51. From the above it is apparent that the increasing air pressure in the chamber 82 will be built up to the value required to deflect the outer peripheral portion of the annular valve element 83 that normally overlies the semi-circular recesses 80 upward and away from the recesses 80 in the annular valve seat element 79 before the pressure in the chamber 51 is built up to the value required to deflect the outer peripheral portion of the valve element 59 upward and away from the perforations 56 in the valve seat element 55. Consequently, most of the fluid forced from the compression chamber 19 during each upward stroke of the piston 34 while the compressor 1 is operating unloaded will flow past the upwardly deflected peripheral portion of the annular valve element 83 to the chamber 92 and thence through the filter element 87 to atmosphere.

It has been found by actual test that, when a pressure relief device 6 and a pipe T 10 are connected to the pipes 11 and 7 as shown in FIG. 1 of the drawing, the temperature of the air inside the pipe 11 may be as much as two hundred (200) degree Fahrenheit lower than is the case when the pipe 11 is connected directly to the compressor inlet valve chamber 8 and the relief valve 6 and pipe T 10 omitted.

If pipe 11 were connected directly to the chamber 8 and the air inlet filter 5, the internal parts of the filter would be subjected to the temperature of the air in the pipe 11 during the time the compressor 1 is operating unloaded. Certain types of filters contain combustible parts, such as felt, and other parts that may be damaged when subjected to excessive temperatures. It has been found in actual practice that, when this type of air inlet filter is connected by a pipe of substantial length directly to the air inlet chamber of an air compressor without a relief valve, such as applicant's pressure relief device 6, the combustible parts of the filter actually ignite and burn as the result of being subjected to excessive temperatures during the time the compressor is operating unloaded, and other parts of the filter become charred and damaged. The addition of applicant's pressure relief device 6 eliminates such damage to the inlet filter of an air compressor installation when the compressor is operating unloaded by releasing directly to atmosphere a substantial amount of the air forced from the compression chamber of the compressor during the upward stroke of the piston.

It will be seen, therefore, that by thus releasing air directly to atmosphere via a pressure relief device, "churning" or oscillatory movement of the same air back and forth within the intake pipe and the consequent increase in the temperature of this air and of the intake pipe in which this air is contained is prevented. As a result, the metallic parts of the compressor remain cooler than they otherwise would, and hot air is not drawn into the compression chamber of the compressor from the intake pipe at the time the compressor is reloaded. Consequently, due to the fact that the air drawn into the compression chamber of the compressor while the compressor operates unloaded and also at the time the compressor is reloaded is substantially at atmospheric temperature, the operating temperature of the metallic parts of the compressor and the temperature of the air delivered by the compressor is considerably lower than would be the case if the arrangement including a pressure relief device as provided by this invention were not employed.

Having now described the invention, what we claim as new and desire to secure by Letters Patent is:

1. An air compressing installation comprising an air compressor having a compression chamber and an air compressing piston for compressing air in said chamber, air inlet means for said piston having an inlet valve chamber and an inlet valve for controlling flow from said inlet valve chamber to said compression chamber, unloading means operatable to hold said inlet valve open to unload said compressor, a conduit connected to said inlet valve chamber and having two branches one of which is substantially longer than the other branch, a first check valve in said one branch for permitting flow of fluid therethrough in the direction of said inlet valve chamber and preventing flow in the opposite direction, a second check valve located adjacent to said first check valve in said one branch for permitting flow of fluid therethrough from said inlet valve chamber to atmosphere and preventing flow in the opposite direction, and a third check valve in said other branch adjacent to said inlet valve chamber for permitting flow of fluid therethrough from said inlet valve chamber to atmosphere and preventing flow in the opposite direction.

2. An air compressing installation comprising an air compressor having a compression chamber and an air compressing piston for compressing air in said chamber, air inlet means for the piston having an inlet valve chamber and an inlet valve for controlling flow from said inlet valve chamber to said compression chamber, unloading means operable to hold said inlet valve open to unload said compressor, a conduit connected to said inlet valve chamber and having two branches one branch of which is substantially longer than the other branch, a first check valve in said one branch for permitting flow of fluid therethrough in the direction of said inlet valve chamber and preventing flow in the opposite direction, a first filter element arranged on the upstream side of said first check valve for filtering fluid flowing from atmosphere through said first check valve and said one branch of said conduit to said inlet valve chamber, a second check valve located adjacent to said first check valve in said one branch for permitting flow of fluid therethrough from said inlet valve chamber to atmosphere and preventing flow in the opposite direction, a second filter element arranged on the downstream side of said second check valve for filtering fluid flowing from atmosphere to said inlet valve chamber during the intake stroke of the piston in the event of rupture of said second check valve, a third check valve in said other branch adjacent to said inlet valve chamber for permitting flow of fluid therethrough from said inlet valve chamber to atmosphere and preventing flow in the opposite direction, and a third filter element arranged on the downstream side of said third check valve for filtering fluid flowing from atmosphere to said inlet valve chamber in the event of rupture of said third check valve.

References Cited in the file of this patent

UNITED STATES PATENTS

| | | |
|---|---|---|
| 1,653,110 | Le Valley | Dec. 20, 1927 |
| 2,161,828 | Lamberton | June 13, 1939 |
| 2,520,771 | Martin et al. | Aug. 29, 1950 |
| 2,728,517 | Shumaker | Dec. 27, 1955 |
| 2,767,805 | Eastman | Oct. 23, 1956 |
| 2,770,320 | Dreznes | Nov. 13, 1956 |
| 2,872,938 | Hansen et al. | Feb. 10, 1959 |